United States Patent
Yabui et al.

(10) Patent No.: US 6,903,165 B2
(45) Date of Patent: Jun. 7, 2005

(54) PROCESS FOR PRODUCING EPOXIDIZED DIENE POLYMER

(75) Inventors: Akihiro Yabui, Ohtake (JP); Yoshihiro Ohtsuka, Ohtake (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 10/468,659

(22) PCT Filed: May 13, 2002

(86) PCT No.: PCT/JP02/04619

§ 371 (c)(1),
(2), (4) Date: Feb. 11, 2004

(87) PCT Pub. No.: WO02/092636

PCT Pub. Date: Nov. 21, 2002

(65) Prior Publication Data

US 2004/0116613 A1 Jun. 17, 2004

(30) Foreign Application Priority Data

May 14, 2001 (JP) .................................... 2001-143840
May 14, 2001 (JP) .................................... 2001-143844

(51) Int. Cl.$^7$ ............................................. C08C 19/06
(52) U.S. Cl. ................... 525/383; 525/385; 525/314; 525/405; 522/158; 522/170
(58) Field of Search ................. 525/405, 314, 525/383, 385; 522/158, 170

(56) References Cited

FOREIGN PATENT DOCUMENTS

| EP | 0779303 A | 6/1997 |
|---|---|---|
| EP | 0810237 A | 12/1997 |
| EP | 1348718 A | 10/2003 |
| JP | 08-104709 A | 4/1996 |
| JP | 08-120022 A | 5/1996 |
| JP | 09-067409 A | 3/1997 |
| JP | 09-067502 A | 3/1997 |
| JP | 09-095512 A | 4/1997 |
| JP | 09-208617 A | 8/1997 |
| JP | 10-298232 A | 11/1998 |
| JP | 10-316715 | * 12/1998 |
| JP | 200-44708 | * 2/2000 |

OTHER PUBLICATIONS

European Search Report.

* cited by examiner

Primary Examiner—Ling-Sui Choi
(74) Attorney, Agent, or Firm—Morgan & Finnegan, LLP

(57) ABSTRACT

A process for producing an epoxidized diene polymer includes: dispersing or suspending a diene polymer (C) having a ball-reduced particle size of 0.05–20 mm in a medium (A) in the presence of powder particles (B) insoluble in the medium (A), or in an aqueous medium in the presence of a phenol-based stabilizer and/or a phosphorus-based stabilizer; and epoxidizing the diene polymer (C) by an epoxidizing agent, therefore, problems associated with epoxidation performed by dissolving diene polymer in a solvent are eliminated; an economical method for epoxidizing, producing, and purifying a diene polymer (C) in a solid form is provided; and the epoxidized diene polymer having an excellent heat stability can be obtained.

20 Claims, No Drawings

PROCESS FOR PRODUCING EPOXIDIZED DIENE POLYMER

BACKGROUND OF THE INVENTION

1. Field of the Invention

The present invention relates to a process for producing an epoxidized diene polymer which is used for coatings, resin modifiers, rubber modifiers, adhesives, and so on. More particularly, the present invention relates to a process for producing an epoxidized diene polymer, in which when performing an epoxidation of a double bond in the diene polymer chain, the diene polymer is dispersed and suspended in an insoluble medium such as water or the like and is epoxidized in the presence of powder particles insoluble in the medium or in the presence of both the powder particles and a thermo-stabilizer, to thereby obtain the epoxidized diene polymers with a low gel content and/or with an excellent thermal stability.

2. Description of the Related Art

Heretofore, as a process for producing an epoxidized diene polymer by the oxidization of a diene polymer to be epoxidized, the following methods have been known in the art:

(i) a method in which a percarboxylic acid is previously prepared as an epoxidation agent by reacting hydrogen peroxide with a lower carboxylic acid such as formic acid or acetic acid, and the percarboxylic acid is then added in a reaction system to initiate an epoxidation reaction in the presence or absence of a solvent; and (ii) a method in which an epoxidation is performed using hydrogen peroxide in the presence of a catalyst such as osmium salt or tungstic acid and a solvent.

Each of the methods (i) and (ii) is characterized by dissolving a diene polymer to be epoxidized in a solvent to effectively execute an epoxidation reaction. However, there is a disadvantage in that the recovery of products is extremely troublesome because of complicated steps of dissolving the diene polymer to be epoxidized in the solvent, and performing a washing treatment with water to eliminate by-products such as carboxylic acids and desolvation operation. In particular, when the organic polymer to be epoxidized is a rubber polymer, there is a problem in that the epoxidized products have adhesive properties. That is, the adhesive properties of such products will cause blocking of the products just after production, difficulty in handling, workability being changed for the worse, blocking at the time of storing the products, and so on.

Furthermore, depending on the product form, a usage mode is limited. When the product is used as a modifying agent, it may become a bale form in which the product cannot be manufactured as powder, clam, pellet, or the like after denaturing by epoxidation.

Regarding the process for producing an epoxidized diene polymer, the present inventors and coworkers have provided many proposals. In JP-A-08-120022, for example, there is proposed a method comprising the following steps: (1) mixing a diene polymer and/or partially hydrogenated product thereof with an organic solvent to obtain an organic solvent slurry or an organic solution of the diene polymer; (2) epoxidizing a double bond in the diene polymer using an epoxidation agent; (3) neutralizing and/or washing the epoxidation-reaction solution; (4) stripping a solution with 5 to 50 wt % of the epoxidized block copolymer in the presence of a surfactant at a temperature equal to or higher than the boiling point of the organic solvent, or at an azeotropic temperature or higher if the organic solvent and water form an azeotropic mixture, but not higher than 120° C. to obtain a slurry in which the epoxidized block copolymer is dispersed in water; (5) dehydrating the clam of epoxidized block copolymer containing water obtained in the previous step to a water content of 1 to 30 wt %; and (6) drying the epoxidized block copolymer obtained in the previous step to a water content of 1 wt % or less.

In JP-A-09-60479, there is proposed a method in which a screw-extruder type throttle dehydrator is used in the above drying step (6). In JP-A-09-95512, there is proposed a method for recovering epoxidized block copolymer, in which an organic solvent is removed through a direct vaporization by supplying the epoxidized block copolymer obtained in the above step (3) into a vaporizer. Further, in JP-08-104709, there is proposed a process for producing an epoxidized block copolymer having an improved gel content by specifying an acid number of a product.

However, each of these methods of the inventions relates to the epoxydized block copolymer in accordance with a uniform solution method for the epoxidation after dissolving the polymer (raw material) in the solvent, which is characterized by producing the product having a low gel content. The handling of high viscosity solution is full of difficulty. Furthermore, epoxidized block copolymers obtained by those methods have comparatively low softening points, respectively. Therefore, during the production, processing, transportation, or usage of such polymers, any trouble maybe caused in handling. For example, the pellets of the copolymer become blocked on their surfaces with each other or strongly adhered with each other.

As a method to cope with the problems, JP-A-09-67502 proposes one characterized by the addition of a blocking-preventing agent to the obtained epoxidized copolymer.

In JP-A-09-208617, there is proposed a chemically modified diene polymer composition and a preparation method therefor, where the polymer in the form of micro particles having a size of 0.05 to 10 ìm in water is denatured with epoxidation. However, it only discloses the process for producing the composition, so that there is no description about the recovery of epoxidized polymer, the improvement on blocking of the product, or the like. In JP-A-10-298232, furthermore, there is proposed a method for the epoxidation in an aqueous dispersion. However, the method is provided for specifically epoxidizing only the surface of polymer particle. Both applications do not mention about the heat stability of the obtained epoxy chemical product alone.

SUMMARY OF THE INVENTION

The present invention has been made in view of the above, and an object of the present invention I is to provide a process for producing a particulate epoxidized diene polymer, where a diene polymer is denatured with epoxidation to obtain an epoxidized diene polymer which can be used as a modifier or the like for typical synthetic resins or one of components that make up synthetic resin compositions, while overcoming the conventional problems to be caused in the conventional epoxy denaturation method, for example, a method in which the epoxy denaturation is performed by dissolving the diene polymer in a solvent, and the conventional epoxy denatured compound, where the problems include, for example, troublesome in the handling of the compound to be caused by the properties of adhesiveness generally included therein.

An object of the present invention II is to provide a method for cost-effectively producing an epoxidized diene copolymer with excellent heat stability.

As the present inventors have enthusiastically studied for attaining the object of the present invention I, the present inventors have finally accomplished the present invention I by finding a process for producing a polymer with a low gel content by performing in the presence of powder particle the epoxidation in the solvent where the polymer cannot be dissolved, in the epoxidation reaction step. Such a method solves the problems such as the blocking or adhesive properties of the product. Concretely, the present inventors have found a process for producing an epoxidized diene polymer with low gel content, which is the final product in a state of without being blocked, by the steps of: proceeding an epoxidation reaction in the medium without causing blocking in the presence of an insoluble medium and powder particles, where the epoxidation of diene polymer is performed using peracetic acid and a reaction accelerator in a system where the diene polymer is dispersed or suspended as a solid form such as pellets or powders; and drying the product while keeping its epoxidized form.

As the present inventors have enthusiastically studied for attaining the object of the present invention II, the present inventors have finally accomplished the present invention II by finding a process for producing a polymer with an excellent heat stability by performing the epoxidation in a water dispersion system in the presence of a heat stabilizer. Concretely, the present inventors have found a process for producing an epoxidized diene polymer with an excellent heat stability, by the steps of: performing the epoxidation of diene polymer in an aqueous solvent using peracetic acid and a reaction accelerator, in a system where the diene polymer is dispersed or suspended as a solid form such as pellets or powders in the presence of a phenol-based stabilizer and/or a phosphorus-based stabilizer and powder particles; and separating and recovering the product in a solid form, followed by removing the solvent from the product.

Therefore, according to a first aspect of the present invention, there is provided a process for producing an epoxidized diene polymer, the method comprising: dispersing or suspending a diene polymer (C) in a medium (A) in the presence of powder particles (B) insoluble in the medium (A); and epoxidizing a double bound of the diene polymer (C) by an epoxidizing agent in the presence of an optionally added phenol-based stabilizer and/or an optionally added phosphorus-based stabilizer.

According to a second aspect of the invention, there is provided a process for producing an epoxidized diene polymer, the method comprising: dispersing or suspending a diene polymer (C) in an aqueous medium in the presence of a phenol-based stabilizer and/or an phosphorus-based stabilizer; and epoxidizing the diene polymer (C) by an epoxidizing agent in the presence of powder particles (B) insoluble in a medium which is optionally added.

According to a third aspect of the invention, there is provided a process for producing an epoxidized diene polymer as described in the above-mentioned first aspect, in which the medium (A) is an inert medium that does not dissolve the diene polymer.

According to a fourth aspect of the invention, there is provided a process for producing an epoxidized diene polymer as described in the above-mentioned third aspect, in which the medium (A) is water.

According to a fifth aspect of the invention, there is provided a process for producing an epoxidized diene polymer as described in the above-mentioned first or second aspect, in which the powder particles (B) are inorganic particles and/or organic-inorganic complex particles.

According to a sixth aspect of the invention, there is provided a process for producing an epoxidized diene polymer as described in the above-mentioned fifth aspect, in which the inorganic particles are talc and/or silica.

According to a seventh aspect of the invention, there is provided a process for producing an epoxidized diene polymer as described in the above-mentioned first or second aspect, in which the total usage amount of the phenol-based stabilizer and/or phosphorus-based stabilizer is 0.05–5 parts by weight with respect to 100 parts by weight of the diene polymer.

According to an eighth aspect of the invention, there is provided a process for producing an epoxidized diene polymer (C) as described in the above-mentioned first or second aspect, in which the diene polymer (C) is at least one selected from the group consisting of: butadiene polymer, styrene/butadiene copolymer, isoprene polymer, styrene/isoprene copolymer, acrylonitrile/butadiene copolymer, and partial hydrides thereof.

According to a ninth aspect of the invention, there is provided a process for producing an epoxidized diene polymer as described in the above-mentioned eighth aspect, in which the diene polymer has a ball-reduced particle size in the range of 0.05 to 20 mm.

According to a tenth aspect of the invention, there is provided a process for producing an epoxidized diene polymer as described in the above-mentioned first or second aspect, in which the epoxidizing agent is peracetic acid, or the other percarboxylic acid which can be induced using hydrogen peroxide.

According to an eleventh aspect of the invention, there is provided a process for producing an epoxidized diene polymer as described in any one of the above-mentioned first to tenth aspects, a solvent for accelerating an epoxidizing reaction is used at the time of the epoxidizing reaction.

According to a twelfth aspect of the invention, there is provided a process for producing an epoxidized diene polymer as described in the above-mentioned eleventh aspect, the solvent for accelerating the epoxidizing reaction is an organic solvent having an SP (solubility parameter) value of 10 or less.

According to a thirteenth aspect of the invention, there is provided a process for producing an epoxidized diene polymer as described in the above-mentioned twelfth aspect, the solvent for accelerating the epoxidizing reaction is at least one selected from the group consisting of: cyclohexane, toluene, xylene, ethyl acetate, tetrahydrofuran, benzene, methyl ethyl ketone, and chloroform.

According to a fourteenth aspect of the invention, there is provided a process for producing an epoxidized diene polymer as described in the above-mentioned first or second aspect, the epoxidized diene polymer has an oxirane oxygen concentration of 0.3–5.0% by weight.

According to a fifteenth aspect of the invention, there is provided a process for producing an epoxidized diene polymer as described in the above-mentioned first or second aspect, in which the epoxidizing reaction of the diene polymer is performed at a temperature of 10–70° C.

According to a sixteenth aspect of the invention, there is provided a process for producing an epoxidized diene polymer as described in the above-mentioned first or second aspect, the method comprising: a first step in which the diene polymer (C) is epoxidized in the medium in the presence of an epoxidizing agent or in the presence of both an epoxidizing agent and a solvent for accelerating an epoxidizing reaction; a second step in which the epoxidized diene polymer is washed with water, or the epoxidized diene polymer is neutralized and washed with water; and a third step in which the solvent for accelerating the epoxidizing reaction used in the first step is removed, where the third step is an optional step to be provided as necessary.

According to a seventeenth aspect of the invention, there is provided a process for producing an epoxidized diene polymer as described in the above-mentioned sixteenth aspect, in which the second step includes an operation for a solid-liquid separation to separate the epoxidized diene polymer that is to be supplied to the third step.

According to an eighteenth aspect of the invention, there is provided a process for producing an epoxidized diene polymer as described in the above-mentioned sixteenth aspect, in which the removal of the solvent in the third step includes drying the epoxidized diene polymer obtained from the second step, while keeping the particle form of the epoxidized diene polymer.

According to a nineteenth aspect of the invention, there is provided a process for producing an epoxidized diene polymer as described in the above-mentioned eighteenth aspect, in which the removal of the solvent in the third step is performed by a kneading-type evaporator.

According to a twentieth aspect of the invention, there is provided a process for producing an epoxidized diene polymer as described in any one of the above-mentioned first to nineteenth aspects, in which the resulting epoxidized diene polymer has a gel content of not more than 2% by weight.

According to a twenty-first aspect of the invention, there is provided a process for producing an epoxidized diene polymer as described in any one of the above-mentioned first to nineteenth aspects, in which the gel content of the epoxidized diene polymer after heating it in an oven for 30 minutes at a temperature of 180° C. (in air) is less than 2.5 times of the gel content of the epoxidized diene polymer before the heating.

DETAILED DESCRIPTION OF THE PREFERRED EMBODIMENTS

Hereinafter, we will describe preferred embodiments of the present inventions I and II.

In the present inventions I and II, diene polymers (C) which can be used as raw materials of the epoxidation include polymers of butadiene alone, copolymers of butadiene and other monomers, polymers of isoprene alone, or copolymers of isoprene and other monomers.

As the other monomers to be copolymerized with butadiene or isoprene include, for example, the other conjugated dienes, vinyl compounds, and the like.

The other conjugated dienes to be copolymerized with butadiene include, for example, isoprene, 1,3-pentadiene (also referred to as piperylene), 2,3-dimethyl-1,3-butadiene, 3-butyl-1,3-octadiene, and phenyl-1,3-butadiene. Each of these other conjugated dienes can be used alone or they can be used as a combination of two or more members.

In addition, the other conjugated diene to be copolymerized with isoprene include, for example, butadiene, 1,3-pentadiene, 2,3-dimethyl-1,3-butadiene, 3-butyl-1,3-octadiene, and phenyl-1,3-butadiene. Among them, butadiene and isoprene are preferable. Each of these other conjugated dienes can be used alone or they can be used as a combination of two or more members.

Furthermore, vinyl compounds to be copolymerized with butadiene or isoprene include, for example, alkyl-substituted styrenes such as styrene, á-methylstyrene, o-methylstyrene, m-methylstyrene, p-methylstyrene, and p-tert-butylstyrene; alkoxy-substituted styrenes such as o-methoxystyrene, m-methoxystyrene, and p-methoxystyrene; vinyl aromatic compounds such as divinylbenzene, and 1,1-diphenylstyrene; unsaturated monocarboxylate esters such as methyl (meta)acrylate, ethyl (meta)acrylate, n-propyl (meta)acrylate, i-propyl (meta)acrylate, n-butyl (meta) acrylate, i-butyl (meta)acrylate, sec-butyl (meta)acrylate, t-butyl (meta)acrylate, lauryl (meta)acrylate, methyl crotonate, ethyl crotonate, methyl cinnamate, and ethyl cinnamate; fluoroalkyl (meta)acrylates such as 2,2,2-trifluoroethyl (meta)acrylate, 2,2,3,3,3-pentafluoropropyl (meta)acrylate, and 2,2,3,3,4,4,4-heptafluorobutyl (meta) acrylate; (meta)acryloyl group containing siloxanyl compounds such as 3-(trimethylsiloxanyl dimethylsilyl)propyl (meta)acrylate, 3-[tris(trimethylsiloxanyl)silyl]propyl (meta)acrylate, and di-[3-(meta)acryloylpropyl]dimethylsilyl ether; mono- or di-(meta)acrylates of alkyleneglycol such as ethylene glycol, 1, 2-propanediol, 1,3-propanediol, and 1,6-hexanediol; alkoxyalkyl (meta)acrylates such as 2-methoxyethyl (meta)acrylate, 2-ethoxyethyl (meta) acrylate, 3-methoxypropyl (meta)acrylate, and 3-ethoxypropyl (meta)acrylate; cyanoalkyl (meta) acrylates such as 2-cyanoethyl (meta)acrylate and 3-cyanopropyl (meta)acrylate; oligo (meta)acrylates such as di-, tri-, or tetra (meta)acrylates of at least trivalent polyhydric alcohols such as glycerin, 1,2,4-butanetriol, pentaerythritol, and trimethylolalkane (the number of carbons in alkane is, for example, 1 to 3); cyanated vinyl compounds such as (meta) acrylonitrile, á-chloroacrylonitrile, and cyanatedvinylidene; unsaturated amides such as (meta)acrylamide, N-methylol (meta)acrylamide, N,N'-methylene bis(meta)acrylamide, and N,N'-ethylene bis(meta) acrylamide; hydroxyalkyl (meta)acrylates such as 2-hydoroxyethyl (meta) acrylate, and 2-hydroxypropyl (meta)acrylate; hydroxyalkyl esters of unsaturated monocarboxylic acids, such as 2-hydroxyethyl crotonate, 2-hydroxypropyl crotonate, 2-hydroxyethyl cinnamate, and 2-hydroxypropyl cinnamate; unsaturated alcohols such as (meta)allyl alcohol; unsaturated monocarboxylic acids such as (meta) acrylic acid, crotonic acid, and cinnamic acid; unsaturated polycarboxylicacids(anhydrides) such as; (anhydrous) maleic acid, fumaric acid, (anhydrous) itaconic acid, and citraconic acid; mono- or di-esters of the unsaturated polycarboxylic acids described above; unsaturated compounds containing epoxy groups such as (meta) allylglycidyl ether, and glycidyl (meta)acylate; and vinyl chloride, vinyl acetate, sodium isoprene sulfonate, di-cyclopentadiene, and ethylidene norbornene.

Among them, styrene-based vinyl compounds are preferable. Each of these vinyl compounds can be used alone or they can be used as a combination of two or more members.

In the present inventions I and II, butadiene copolymers and isoprene copolymers may be random copolymers or block copolymers.

Polymers to be epoxidized preferably include polymers of butadiene alone, random copolymers of butadiene and styrene, random copolymers of butadiene and (meta) acrylonitrile, block copolymers of butadiene and styrene, random copolymers of isoprene and styrene, random copolymers of isoprene and (meta)acrylonitrile, block copolymers of isoprene and styrene, and copolymers of butadiene and isoprene. In some cases, the copolymers of buta diene and isoprene may include vinyl compounds such as styrene and (meta) acrylonitrile.

A butadiene content ratio in the butadiene copolymers or an isoprene content ratio in the isoprene copolymers is 0.5–99.5% by weight in general, preferably 1–95% by weight, more preferably 5–90% by weight.

In the copolymers of butadiene and isoprene, the content ratio of butadiene is 0.5–99.5% by weight in general, preferably 195% by weight, more preferably 5–95% by weight, particularly preferably 5–90% by weight, while the content of isoprene is 0.5–99.5% by weight in general, preferably 5–99% by weight, more preferably 5–95% by weight, particularly preferably 10–95% by weight. In some cases, the content ratio of vinyl compound to be used is 0–99% by weight in general, preferably 0–95% by weight, more preferably 0–90% by weight.

When the above diene polymer (c) is a block copolymer, then the composition of the copolymer may be, for example, polystyrene/polybutadiene block copolymer, polystyrene/polybutadiene/polystyrene block copolymer (SBS), polystyrene/polyisoprene/polystyrene block copolymer (SIS), or polyacrylonitril/polybutadiene block copolymer (NBR).

In these diene copolymers, furthermore, any partially hydrogenated diene copolymers where parts of diene components are hydrogenated allow to be used. In each of these block copolymers, moreover, the structure of the molecule itself may be of any shape such as a linear, branched, or radial shape.

Among the polymers described above, the resin or rubber polymer to be used as the diene polymer (c) may be preferably one selected from the group of butadiene polymer, styrene/butadiene copolymer, isoprene polymer, styrene/isoprene copolymer, and acrylonitrile/butadiene copolymer, and their partially hydride products.

The weight average molecular weight of the above diene polymer (c) is, though not limited in particular, preferably in a range where the diene polymer (C) cannot be dissolved in organic solvents of low molecular weight, more preferably in the range of 1,000 to 5,000,000, particularly preferable in the range of 5,000 to 500,000.

The terminal group of the above diene polymer (C) is not limited in particular.

In the present invention I, it is important that the diene polymer (C) is in a solid form at the reaction temperature of the epoxidation. The phrase "in a solid format the reaction temperature of the epoxidation" means that it is in the solid form such as powders or powder particles at the reaction temperature of the epoxidation. In other words, it means that the diene polymer (C) is not in a liquid or paste form at that reaction temperature.

The diene polymer (C) may be in the form of a commercially available pellet if the ball-reduced particle size (hereinafter, simply referred to as a particle size) of the diene polymer (C) is in the range described above. For effectively performing the epoxidation reaction, the surface area of the diene polymer (C) may be increased by means of crushing. The method for crushing the diene polymer (C) may be any method using the typical crusher well known in the art. If the diene polymer (C) is a rubber polymer, it is preferable to crush the polymer using a freeze crush method.

More specifically, the particle size of the diene polymer (C) is in the range of 0.05 to 20 mm, preferably 0.07 to 20 mm, particularly preferable 0.1 to 20 mm in average.

If the particle size of the diene polymer (C) is less than 0.05 mm, it becomes difficult to manipulate the polymer, especially to perform a solid-liquid separation If the particle size of the diene polymer (C) is larger than 20 mm, then the surface area of the diene polymer (C) becomes small. Thus, the epoxidation reaction from the surface proceeds slowly, failing to achieve the characteristics of the present invention.

The term "ball-reduced particle size" is defined as a diameter of the ball having the same volume as an average volume of the diene polymer (C).

The shape of the diene polymer (C) may be, but not limited to, spherical, cube, rectangular, cylindrical, prismatic, conical, semispherical, rugby ball, egg, cocoon, or the like, or any combination thereof. In either shape, it is preferable that the average particle size of the diene polymer (C) in terms of a ball is in the above range.

In the present invention II, it is important that the diene polymer (C) is dispersed and/or suspended in a reaction system of aqueous medium in the presence of a phenol-based stabilizer and/or a phosphorus-based stabilizer, where the ball-reduced particle size is in the same range as that of the present invention I.

If the diene polymer (C) is dispersed or suspended at the reaction temperature, it means that the diene polymer (C) is in the solid form of powders, particles, or the like. In addition, it means that the diene polymer is not in the form of liquid- or paste-like powders or particles, or any combination thereof to form any linked structure. If the diene polymer is a liquid- or paste-like powder, these powders become easy to coagulate with each other, so that it becomes difficult to stir the mixture.

In the present invention I, the medium (A) to be used is an inactive solvent that does not substantially dissolve the diene polymer (C) of the present invention, including water, alcohol such as methanol or ethanol, ketone such as acetone, linear aliphatic hydrocarbon such as normal hexane, normal heptane, or normal octane, or the like. Among them, a preferable medium is water, methanol, or ethanol.

The powder particles (B) insoluble in the above medium (A) are inorganic particles, organic/inorganic complex particles, or a mixture thereof having an average particle size of 0.1–100 ìm in general, preferably 0.1–50 ìm. If the average particle size is larger than 100 ìm, the blocking-preventing effect can be decreased. Thus, it is not preferable because of the increase in the usage amount.

The inorganic particles include talc, silica, mica, diatomite, kaolin, barium sulfate, calcium carbonate, magnesium carbonate, magnesium hydroxide, magnesium oxide, and so on. Preferable inorganic particles are talc, silica, magnesium hydroxide, and magnesium oxide.

The organic/inorganic complex particles include colloidal silica or sol-gel processed silica as described in JP-A-09-194208, core/shell complex disclosed in JP-A-2001-98164, and so on.

The blending ratio of the medium (A), the insoluble powder particles (B), and the diene polymer (C) is 50–1000 parts by weight, preferably 100–1000 parts by weight of the medium (A), and 0.01–5 parts by weight, preferably 0.05–3 parts by weight of the powder particles (B) with respect to 100 parts by weight of the diene polymer (C).

If the usage amount of the medium (A) is less than 50 parts by weight, the diene polymer (C) cannot be sufficiently dispersed or suspended in the medium (A). On the other hand, if it is more than 1000 parts by weight, the concentration of the epoxidation agent becomes low causing the epoxidation reaction to take more time, so that it becomes inefficient.

The usage amount of the powder particles (B) is less than 0:01 parts by weight, the blocking between pellets is generated to form a block, so that it becomes to difficult to remove it. On the other hand, if it is more than 5 parts by weight, undesired powder particles are contaminated into drainage. Thus, the recovery method becomes complicated, so that it is not preferable.

In the process for producing the epoxidized diene polymer in accordance with the present invention I, there are three steps. That is, the first step is an epoxidation reaction where the diene polymer is epoxidized with a peroxide in the presence of powder particles in the medium (A) in which the diene polymer is insoluble, the second step is a washing step, or neutralization and washing steps, and the third step is one for removing the solvent from the mixture.

In the method, preferably, an organic solvent is used as a reaction accelerator in the first step.

In the second step, the polymer is subjected to the washing, or the neutralization and washing and is then separated by means of a solid-liquid separation, followed by supplying the polymer to the third step. In the third step, subsequently, the polymer obtained from the second step is dried while keeping the form thereof, followed by collecting the product as the desired epoxidized diene polymer.

The characteristics of the present invention I include the capability of preventing the blocking during the epoxidation reaction performed in a dispersion system by the use of powder particles at the time of epoxidation, as well as preventing the blocking of the product obtained by the drying treatment. Furthermore, another characteristic feature is that the gel content in the resulting epoxidized diene polymer is low, compared with the conventional one.

The reaction accelerators used in the epoxidation reaction, which differ according to the type of the diene polymer (C) and the reaction conditions of the epoxidation, include linear and branched hydrocarbons such as hexane and octane, and their alkyl-substituted derivatives; alicyclic hydrocarbons such as cyclohexane and cycloheptane, and their alkyl-substituted derivatives; aromatic hydrocarbons such as benzene, naphtalene, toluene, and xylene, and their alkyl substituted aromatic hydrocarbons; aliphatic carboxylates such as methyl acetate, ethyl acetate; halogenated hydrocarbons such as chloroform; and so on. Among them, from the points of capability of dissolving the peroxide as the epoxidizing agent, the solubility of the dine polymer (C) the facility to collect the organic solvent after the epoxidation, and so on, cyclohexane (solubility parameter value, i.e., SP=8.2), ethyl acetate (SP=9.1), chloroform (SP=9.3), benzene (SP=9.2), toluene (SP=8.9), xylene (SP=8.8), hexane (SP=7.4), tetrahydrofuran (SP=9.1), and so on are preferable. Each of them may be used alone or they may be used as a combination of two or more thereof.

In addition, these organic solvents as the reaction accelerators can be selected depending on the type of the diene polymer (C). The organic solvent has the function of infiltrating into the inside of the diene polymer (C) in a solid state to transfer the agent into the inside of the diene polymer (C) and to epoxidize the inside of the dienepolymer (C). Thus, the criteria for selecting the organic solvent is one capable of dissolving or swelling the diene polymer (C), or being infiltrated into the diene polymer (C) and having a solubility parameter value in the range of 7.0 to 10. The organic solvent having a solubility parameter value of over 10 shows insufficient abilities of dissolving or swelling the diene polymer (C), or being infiltrated into the diene polymer (C), so that it cannot function as a desired reaction accelerator. In addition, the organic solvent having a solubility parameter value of less than 7.0 is similarly unpreferable.

As described above, the reaction accelerator is responsible for dissolving or swelling the diene polymer (C), or being infiltrated into the diene polymer (C). Depending on the usage amount of the reaction accelerator, therefore, there is a possibility that the reaction in an aqueous dispersion system, which is the characteristic feature of the present invention, cannot be progressed due to the generation of blocking between the polymer particles. That is, the surface of the pellet becomes dissolved, so that the blocking between diene polymers can occur. As a result, agitation becomes impossible and then the product becomes difficult to be collected from the reaction vessel.

The blending ratio of the reaction accelerator to the diene polymer (C) is appropriately selected according to the type of the diene polymer, the type of the reaction accelerator, the reaction temperature, and so on. In general, however, the reaction accelerator may be of 0.5–100 parts by weight, preferably 0.5–75 parts by weight with respect to 100 parts by weight of the diene polymer (C).

If the blending amount of the reaction accelerator is less than 0.5 parts by weight, it means that the amount of the reaction accelerator to be required to the reaction between the diene polymer (C) and the epoxidizing agent is insufficient. In this case, therefore, it is inefficient because the epoxidation reaction takes much time to complete. In addition, if the blending amount of the reaction accelerator is over 100 parts by weight, the surface of pellet or powder (hereinafter, simply referred to as "pellet", except in Examples) of the diene polymer (C) becomes dissolved, causing the blocking between the diene polymer pellets. In this case, it may become difficult to perform dispersion by agitation during the epoxidation reaction. Thus, the epoxidation reaction in a dispersed state is liable to become impossible. In addition, it becomes difficult to collect the epoxidized product from the reaction vessel.

In the process for producing the epoxidized diene polymer in accordance with the present invention II, the epoxidation reaction is performed in an aqueous medium. The epoxidizing agent is infiltrated into the inside of the dispersed particle of the diene polymer (C). Therefore, the organic solvent described in the present invention I may be used as a solvent for accelerating the epoxidation reaction.

In the method of the present invention II, a phenol-based stabilizer and/or a phosphorus-based stabilizer for improving the heat stability of the epoxidized diene polymer product at the time of an epoxidation reaction is provided in a reaction system.

The typical examples of the phenol-based stabilizer include tetrakis(methylene-3-(3',5'-di-tert-butyl-4'-hydroxyphenyl)propionate)methane, 1,3,5-trimethyl-2,4,6-tris(3,5-di-tert-butyl-4'-hydroxybenzyl)benzene, 2,6-di-tert-butyl-4-methylphenol, 4-hydroxymethyl-2,6-di-tert-butylphenol, 2,4-bis-(n-octylthio)-6-(4-hydroxy-3-5-di-tert-butylanilino)-1,3,5-triazine, octadecyl-3-(3,5-di-tert-butyl-4-hydroxyphenyl)propionate, triethyleneglycol-bis(3-(3-tert-butyl-5-methyl-4-hydroxyphenyl)propionate), 1,3,5-tris-(4-tert-butyl-3-hydroxy-2,6-dimethylbenzyl) isocyanurate, 2,2'-methylene-bis(4-methyl-6-tert-butylphenol), 3,9-bis(2-(3-(3-tert-butyl-4-hydroxy-5-methylphenyl)propionyloxy)-1,1-dimethylethyl)-2,4,8,10-tetraoxaspiro[5,5]undecane, 2,6-di-tert-butyl-4-ethylphenol, butylated hydroxyanisole, 2,2'-dihydroxy-3,3'-dicyclohexyl-5,5'-dimethyl-diphenylmethane, 1,1,3-tris(2-methyl-4-hydroxy-5-tert-butylphenyl)butane, 4,4'-butylidene-bis-6-tert-butyl-m-cresol, bis(3-cyclohexyl-2-hydroxy-5-methylphenyl)methane, 2,2'-methylene-bis-(4- ethyl-6-tert-butylphenol), 1,1-methylene-bis-(2'-methyl-4'-hydroxy-5'-tert-butylphenyl)butane, and so on. These phenol-based stabilizers may be used as a combination of two or more thereof.

Also, the typical examples of the phosphorus-based stabilizer include trisnonylphenyl phosphite, tris(2,4-di-tert-butylphenyl)phosphite, tris(2-tert-butylphenyl)phospite, tris(2,6-di-tert-butylphenyl)phospite, tris(2,4-bis(1,1-dimethylpropyl)phenyl)phosphite, and so on. Each of these phosphorus-based stabilizers may be used alone, or they may be used as a combination of two or more thereof.

The usage amount of the stabilizer may be 0.01–5 parts by weight, preferably 0.01–3 parts by weight, more preferably 0.05–5 parts by weight, still more preferably 0.1–5 parts by weight, particularly preferably 0.1–2 parts by weight with respect to 100 parts by weight of the diene polymer (C). If the usage amount of the stabilizer is less than 0.01 parts by weight, the improved effects cannot be found in the heat stability and the tone of color. In addition, even if it is over 5 parts by weight, effects beyond those obtainable in the present invention cannot be attained.

The stabilizer can be uniformly dispersed in the epoxidized diene polymer (C) by adding the stabilizer at the time of epoxidation reaction. In addition, therefore, one of the operations, known as a post-addition to be performed at the time of extrusion becomes unnecessary.

The production method according to the present invention II includes the following steps. That is, a first step of performing an epoxidation reaction of the diedine polymer with a peroxide in the presence of the heat stabilizer in the aqueous solvent, a second step being a washing step, or being neutralization and washing steps, and optionally a third step of removing a solvent if the first step uses an organic solvent as a reaction accelerator. In the second step, the polymer that has been subjected to the washing step or the neutralization and washing steps is separated through a solid-liquid separation. In the third step, subsequently, the polymer obtained from the second step is dried while keeping the form thereof, and/or is dried using a mixing vaporizer, thereby recovering the product as the desired epoxidized diene polymer.

One of the characteristics of the present invention II is an excellent heat stability of the epoxidized diene polymer obtained by using the heat stabilizer at the time of epoxidation and uniformly infiltrating it into the diene polymer.

The reaction-accelerating solvent, which can be used for the epoxidation of diene polymer (C) in a state of being dispersed and/or suspended, may be preferably a solvent capable of dissolving or swelling the diene polymer (C), or being infiltrated into the diene polymer under the epoxidation conditions. The selection of an appropriate organic solvent differs depending on the type of the diene polymer (C), the reaction conditions of the epoxidation, and so on. Examples of the usable organic solvents include those described in the present invention I.

In addition, these organic solvents are chosen according to the diene polymer targeted for epoxidation. The organic solvent has the functions of dissolving a peroxide (epoxidizing agent) and a heat stabilizer, or infiltrating into the inside of the diene polymer in a solid state to transfer these agents into the inside of the diene polymer (C) and to fix these agents in the diene polymer (C). Thus, the criteria for selecting the organic solvent is preferably to select one capable of dissolving or swelling the diene polymer (C), or being infiltrated into the diene polymer (C), and having a solubility parameter value of 10 or less. The organic solvent having a solubility parameter value of over 10 shows insufficient abilities of dissolving or swelling the diene polymer (C), or being infiltrated into the diene polymer (C), so that it cannot function as the desired reaction accelerator. In the case of using the organic solvent as a reaction-accelerating solvent, the organic solvent may be 0.5–100 parts by weight, preferably 0.5–75 parts by weight with respect to 100 parts by weight of the diene polymer (C). Water may be 50–1000 parts by weight, preferably 100–1000 parts by weight with respect to 100 parts by weight of the diene polymer (C). Furthermore, the amount of water to be used is almost the same even in the absence of the organic solvent.

The reaction-accelerating solvent described above dissolves or swells the diene polymer (C), or is infiltrated into the diene polymer. Depending on the usage amount of the reaction accelerator, therefore, there is a possibility that the reaction in an aqueous dispersion system, which is the characteristic feature of the present invention, cannot be progressed due to generation of blocking between the polymer particles. For preventing the blocking between the polymer particles and proceeding the reaction, the powder particles described in the invention I can be used at the addition ratio described in the invention I.

The peroxide to be used as an epoxidizing agent in the present inventions I and II may be a percarboxylic acid compound such as performic acid, peracetic acid, and perpropionic acid. In addition, the epoxidation can be performed also in a system using the above peroxide including water, which was induced from hydrogen peroxide.

Among these peroxides, peracetic acid is preferable because of its ability to proceed the epoxidation effectively. If one of the percarboxylic acids is used as an epoxidizing agent, the percarboxylic acid is preferably dissolved in the solvent. Examples of the solvents for the percarboxylic acids include hydrocarbons such as hexane, organic acid esters such as ethylacetate, and aromatic hydrocrabons such as toluene. These solvents have the same effects as those of the above reaction accelerators with respect to the epoxidation reaction and are capable of accelerating the epoxidation reaction by infiltrating to the inside of the diene compound (C) Thus, it is preferable to use these solvents.

In the system using a peroxide induced from hydrogen peroxide, there are two methods of performing epoxidation. In one of these methods, hydrogen peroxide is previously reacted with a lower carboxylic acid such as formic acid, acetic acid, propionic acid, butyric acid, and isobutyric acid, to produce a percarboxylic acid. Then, the resulting percarboxylic acid is added as an epoxidizing agent in the reaction system to thereby perform epoxidation. In the other method, an epoxidation is performed using hydrogen peroxide in the presence of a catalyst such as osmium salt and tungstic acid and a solvent. The solvents which can be used in this case are those listed in the above description.

When the epoxidation is performed by a production method according to either the present inventions I or II, the oxirane oxygen concentration of an epoxidized compound to be obtained can be adjusted by changing the reaction molar ratio of the epoxidizing agent and the amount of double bonds in the diene polymer (C).

This reaction molar ratio varies depending on the oxirane oxygen concentration of the epoxidized compound to be obtained. The reaction molar ratio of the amount of double bonds in the organic polymer targeted for epoxidation and the sheer amount of peroxide can be preferably selected from the range of 1.0 to 3.0, preferably from 1.1 to 2.5.

The oxirane oxygen concentration of the epoxidized diene polymer to be obtained by adjusting the reaction molar ratio to be within the above range can be adjusted to 0.3–5.0% by weight, preferably 0.3–4.5% by weight.

The reaction temperature at the time of epoxidizing the diene compound (C) in accordance with a production method according to the present invention I or II varies depending on the type of diene polymer (C), the degree of surface area, the type of the solvent, the type and the quantity of the epoxidizing agent, and the reaction time. However, it can be selected within the range of 10–70° C. If the reaction temperature is less than 10° C., the reaction rate becomes slow and thus not suitable for practical use. If the reaction temperature is over 70° C., it is not preferable because self-decomposition of the peroxide becomes extreme. Furthermore, there is a problem in that the blocking is generated as the surface of the diene polymer (C) is dissolved using the organic solvent. A particularly preferable reaction temperature is in the range of 30 to 60° C.

The reaction pressure for the epoxidation is typically an atmospheric pressure, or it may be a slightly reduced or slightly increased pressure therefrom.

The reaction time for the epoxidation of diene polymer (C) in a production method in accordance with the present invention I or II varies according to the type of diene polymer (C), the degree of surface area, the type of the solvent, the type and quantity of the epoxidizing agent, and the reaction temperature. In general, however, it can be selected within the range of 1 to 24 hours. If the reaction time is less than 1 hour, the conversion rate of the double bond is too small for the practical use. On the other hand, if the reaction time is over 24 hours, for example in the case of using peroxide acid, a side reaction of the diene polymer is generated. Such a side effect is not preferable because it becomes one of causes for the decrease in the yield of the epoxidized diene polymer.

In a production method according to the present invention I, the reaction solution after the epoxidation reaction is in a state in which an epoxidized diene polymer as a product is dispersed or suspended in the medium (A) while keeping its solid state, and it is obtained as a suspension solution in which the organic solvent and carboxylic acid are dissolved in the medium (A). Separation and recovery of the epoxidized compound as a product in a solid form may be performed by filtration, centrifugation, or the like. The separated and recovered epoxidized compound as a product in a solid form is washed with water to remove the medium (A), the organic solvent, the carboxylic acid, and the like, which are attached on the surface thereof.

It is preferable to shift to the next step, i.e., a solvent-removing step, after addition of a heat stabilizer to the solid-form polymer separated by the above method. Such addition of a heat stabilizer is effective to prevent the polymer from degradation due to oxidation and from thermal degradation at the time of removing the organic solvent in the next step. They may be directly added into the product in a solid form, or dissolved in a hydrocarbon solvent before added.

The heat stabilizer which can be used may be a phenol-based stabilizer, a phosphorus-based stabilizer, or the like, which are known in the art and are described in the invention II. The stabilizer may be added in the reaction system during the epoxidation step. The usage amount of the stabilizer is just the same as in the case of the present invention II.

According to the production method of the invention II, the reaction solution after the epoxidation is in a state in which the epoxidized diene copolymer as a product is being dispersed or suspended as a solid form in an aqueous medium and is also obtained as a suspension in which an organic solvent and carboxylic acid are dissolved in the solvent. For separating and recovering the epoxidized compound of a solid-form product from the suspension, filtration, centrifugation, or the like can be used. The separated and recovered epoxidized compound of a solid-form product is washed with water to remove the solvent, carboxylic acid, or the like from the surface thereof. Subsequently, if it is required, neutralization and washing are performed. An alkali solution to be used for the neutralization may be a solution of lithium hydroxide, sodium hydroxide, potassium hydroxide, calcium hydroxide, lithium carbonate, sodium carbonate, potassium carbonate, calcium carbonate, sodium bicarbonate, potassium bicarbonate, sodium acetate, potassium acetate, aqueous ammonia, or the like.

In the method of the inventions I and II, subsequently, the product obtained is dried and is then provided as a product. Here, the term "dry" means that the obtained polymer may be dried by means of desolvation using an indirect heating method such as a steam stripping method, followed by the removal of water or the like by direct heating, and the medium (A) and the organic solvent are directly removed from the obtained polymer using at least one drier selected from a vacuum dryer, a hot air dryer, a mixing-type extruder, and the like, so that the water content of the polymer can be less than 1% by weight.

In the present inventions I and II, various kinds of additives can be added to the polymer depending on the purpose. For example, there are given a softener such as oil, a plasticizer, an antistat, a lubricant, a ultraviolet absorber, a fire retardant, a pigment, an inorganic filler, an organic or inorganic fiber, a reinforcing agent such as a carbon black, and other thermoplastic resins. Incidentally, these additives may be preferably added before introducing to the drying step.

The surface layer of the epoxidized diene polymer particles in the form of a pellet or the like obtained by the invention I or II allows 0.01–5% by weight of inorganic materials to attach with respect to the whole particles. In addition, the center part of the epoxidized diene polymer particles may include unreacted diene polymer that is not reacted in the epoxidation.

In the epoxidized diene polymer obtained by the method of the present inventions I or II, especially of the present invention II, it is preferable that the gel content is 2% or less by weight or less, more preferably 0.2% or less by weight because the external appearance (i.e., the surface condition) of the final product using the epoxy diene polymer becomes excellent.

In addition, as a measure of the heat resistance of the epoxidized diene polymer, it is desirable that a gel content after heating under predetermined conditions is less than 2.5 times, more preferably less than 0–2 times the original gel content. If the gel content is within this limited range, the heat stability of the product can be improved. In addition, after the same heating, a strand is formed by the extruder, and the visual observation is made on the surface of the strand. As a result, no alien substance is found, and this means that the polymer has good heat stability.

EXAMPLES

The present invention will next be described more in detail by way of examples. However, the present invention is not limited only to the examples described hereunder, so long as the scope of the invention is not surpassed.

In the following description, "parts" and "%" are all based on a weight basis.

Various measurements were performed using the following methods, respectively.

(1) Oxygen Concentration of Oxirane:

The oxygen concentration of oxirane of the epoxidized diene polymer is measured in accordance with ASTM-1652.

(2) Gel Content:

0.1 g of the dried epoxidized diene (co)polymer was added in 10 ml of toluene and the mixture was stirred at 25° C. for 3 hours to dissolve the polymer in the toluene. Subsequently, the mixture solution was poured onto a wire mesh (200 mesh sieve). An insoluble matter that was trapped on the wire mesh was dried for 2 hours at 120° C., followed by measuring the weight of the dried product (i.e., the dried epoxidized diene polymer). The resulting weight of the product is expressed in % by weight.

(3) Gel Content After the Application of Heat:

The dried epoxidized diene (co)polymer was left in an oven at 180° C. for 30 minutes (in the air). Then, the content of the solvent-insoluble matter was measured. The measuring result was used as one of measures of the heat stability. If the gel content after the application of heat is less than 2.5 times the gel content before the application of heat, the heat stability is assumed to be almost favorable.

(4) The Surface Condition of the Epoxidized Diene (Co) Polymer After the Application of Heat:

A pellet, which had been heated under the same heating condition as that of the above item (3), was used. The pellet was forced through a melt indexer (a heat temperature of 180° C., a heat-melting time of 5 minutes, a load of 5 kg, and a die diameter of 1 mm) to provide a linear strand of about 1 mm in diameter, followed by making a visual examination of the surface of the resulting strand. The results were symbolized ("O": smooth surface; and "X": grain like surface).

(5) Ball-reduced Particle Size (Also Referred to as "Ball-reduced Average Particle Size"):

The volume of the dried diene (co)polymer particles (dry weight: 5 g) targeted for epoxidation was evaluated by measuring the weight thereof in distilled water, followed by calculating an average volume per particle from that volume. Then, the diameter of a ball having the same volume as the average volume of the particle was calculated and was then provided as ball-reduced particle size or a ball-reduced average particle size.

In the examples and the comparative examples, the same agents and the same instrument were used as follows.

Four-necked flask (capacity: 3 liters): equipped with a stirrer, thermometer, dropping funnel, and reflux condenser, and served as a reaction vessel for an epoxidizing reaction.

Talc: Talc MWHS-T (average particle size: 2.7 ìm), manufactured by Hayashi Kasei Co., Ltd., JAPAN Stabilizer: Irganox 1010 (trade name), manufactured by Chiba Specialty Chemicals, Co., Ltd., and phenolic heat stabilizer.

First, we will describe the examples of the present invention I.

Example I-1

In a four-necked flask were placed 300 g of a block-copolymer of polystyrene-polybutadiene-polystyrene (SBS) (trade name: TR2000, a ball-reduced average particle size of 3.5 mm, manufactured by Japan Synthetic Rubber Co., Ltd.), 600 g of water, and 0.6 g of talc, and the contents were stirred and thoroughly mixed so as to disperse SBS. The inside of the flask was heated to 40° C., and 100 g of 30% ethyl acetate (SP=8.9) solution of peracetic acid was continuously added dropwise to the flask, the mixture being stirred for epoxidation for 5 hours at 40° C.

In each of the examples in the present inventions I and II, without exceptions, the reaction proceeded without causing any blocking between the pellets. After completion of the reaction, solid matter was recovered from the reaction solution by filtration and was then washed with deionized water.

Subsequently, as a post treatment (1), the recovered solid matter was dried under reduced pressure at 120° C. to remove water and the remaining solvent from the solid matter, resulting in 302 g of epoxidized SBS. The obtained epoxidized SBS had 0.2% by weight of toluene-insoluble matter and an oxirane oxygen concentration of 1.5% in the dissolved portion except the surface layer.

On the other hand, as a post treatment (2), the recovered solid matter was subjected to a kneading-type evaporator to remove water and the remaining solvent from the solid matter, resulting in 300 g of epoxidized SBS. The obtained epoxidized SBS had the toluene-insoluble matter in an amount of 0.03% by weight and an oxirane oxygen concentration of 1.5% by weight in the dissolved portion except the surface layer.

Example I-2

In a four-necked flask were placed 300 g of SBS (TR2000) as that used in Example I-1, 600 g of water, and 1.5 g of talc, and the contents were stirred and thoroughly mixed so as to disperse SBS. The inside of the flask was heated to 40° C., and 168 g of 30% ethyl acetate solution of peracetic acid was continuously added dropwise to the flask, the mixture being stirred for epoxidation for 4 hours at 40° C. After completion of the reaction, the reaction solution was processed in the same manner as in Example I-1.

In the post treatment (1), 300 g of epoxidized SBS was obtained. The obtained epoxidized SBS had 0.4% by weight of toluene-insoluble matter and an oxirane oxygen concentration of 2.3% by weight in the dissolved portion except the surface layer.

In the post treatment (2), the resulting epoxidized SBS had the toluene-insoluble matter in an amount of 0.05% by weight and an oxirane oxygen concentration of 2.3% by weight in the dissolved portion except the surface layer.

Example I-3

In a four-necked flask were placed 300 g of a copolymer of polystyrene-polybutadiene-polystyrene (SBS) (trade name: Tafprene 125, a ball-reduced average particle size of 3.0 mm, manufactured by Asahi Kasei Corp.), 600 g of water, and 1.5 g of talc, and the contents were stirred and thoroughly mixed so as to disperse SBS. The inside of the flask was heated to 40° C., and 168 g of 30% ethyl acetate solution of peracetic acid was continuously added dropwise to the flask, the mixture being stirred for epoxidation for 4 hours at 40° C. After completion of the reaction, the reaction solution was processed in the same manner as in Example I-1.

In the post treatment (1), 300 g of epoxidized SBS was obtained. The obtained epoxidized SBS had 0.4% by weight of toluene-insoluble matter and an oxirane oxygen concentration of 2.3% by weight in the dissolved portion except the surface layer.

In the post treatment (2), the resulting epoxidized SBS had the toluene-insoluble matter in an amount of 0.02% by weight and an oxirane oxygen concentration of 2.3% by weight in the dissolved portion except the surface layer.

Example I-4

In a four-necked flask were placed 300 g of SBS (TR2000) used in Example I-1, 700 g of water, and 6 g of talc, and the contents were stirred and thoroughly mixed so as to disperse SBS. The inside of the flask was heated to 40° C., and 250 g of 30% ethyl acetate solution of peracetic acid was continuously added dropwise to the flask, the mixture being stirred for epoxidation for 5 hours at 40° C. After completion of the reaction, the reaction solution was processed in the same manner as in Example I-1.

In the post treatment (1), 300 g of epoxidized SBS was obtained. The obtained epoxidized SBS had 0.9% by weight of toluene-insoluble matter and an oxirane oxygen concentration of 3.0% by weight in the dissolved portion except the surface layer.

In the post treatment (2), the resulting epoxidized SBS had the toluene-insoluble matter in an amount of 0.2% by weight and an oxirane oxygen concentration of 3.0% by weight in the dissolved portion except the surface layer.

Example I-5

In a four-necked flask were placed 300 g of a copolymer of polystyrene-polybutadiene-polystyrene (SBS) (trade name: As a flex 810, a ball-reduced average particle size of 3.8 mm, manufactured by Asahi Kasei Corp.), 600 g of water, and 1.5 g of talc, and the contents were stirred and thoroughly mixed so as to disperse SBS. The inside of the flask was heated to 40° C., and 150 g of 30% ethyl acetate solution of peracetic acid was continuously added dropwise to the flask, the mixture being stirred for epoxidation for 4 hours at 40° C. After completion of the reaction, the reaction solution was processed in the same manner as in Example I-1.

In the post treatment (1), 300 g of epoxidized SBS was obtained. The obtained epoxidized SBS had 0.8% by weight of toluene-insoluble matter and an oxirane oxygen concentration of 1.7% by weight in the dissolved portion except the surface layer.

In the post treatment (2), furthermore, the recovered solid matter was subjected to the kneading-type evaporator under reduced pressure at 200° C. to remove water and the remaining solvent from the solid matter, resulting in obtaining 300 g of epoxidized SBS. The obtained epoxidized SBS had the toluene-insoluble matter in an amount of 0.2% by weight and an oxirane oxygen concentration of 1.7% by weight in the dissolved portion except the surface layer.

Example I-6

In a four-necked flask were placed 300 g of a blockcopolymer of polystyrene-polyisoprene-polystyrene (SIS) (tradename: Clayton D1117, a ball-reduced average particle size of 3.9 mm, manufactured by Shell Chemicals Ltd.), 600 g of water, and 0.6 g of talc, and the contents were stirred and thoroughly mixed so as to disperse SIS. The inside of the flask was heated to 40° C., and 164 g of 30% ethyl acetate solution of peracetic acid was continuously added dropwise to the flask, the mixture being epoxidized for 3 hours at 40° C. After completion of the reaction, the reaction solution was processed in the same manner as in Example I-1.

In the post treatment (1), 302 g of epoxidized SIS was obtained. The obtained epoxidized SIS had 1.5% by weight of toluene-insoluble matter and an oxirane oxygen concentration of 2.2% by weight in the dissolved portion except the surface layer.

In the post treatment (2), the resulting epoxidized SIS had the toluene-insoluble matter in an amount of 1.3% by weight and an oxirane oxygen concentration of 2.2% by weight in the dissolved portion except the surface layer.

Example I-7

In a four-necked flask were placed 300 g of polyacrylonitrile-polybutadiene (NBR) (trade name: Nippol NBR. DN 214, a ball-reduced average particle size of 3.4 mm, manufactured by Nippon Zeon Co. Ltd.), 600 g of water, and 1.5 g of talc, and the contents were stirred and thoroughly mixed so as to disperse NBR. The inside of the flask was heated to 40° C., and 100 g of 30% ethyl acetate solution of peracetic acid was continuously added dropwise to the flask, the mixture being epoxidized for 6 hours at 40° C. After completion of the reaction, solid matter was recovered from the reaction solution by filtration and was then washed with deionized water.

From the recovered solid matter, water and the remaining solvent were removed under reduced pressure to obtain 299 g of epoxidized NBR. The obtained epoxidized NBR had the toluene-insoluble matter in an amount of 1.2% by weight and an oxirane oxygen concentration of 1.5% by weight in the dissolved portion except the surface layer.

Comparative Examples I-1 to I-5

The comparative Examples I-1, I-2, I-3, I-4, and I-5 were performed by almost the same ways as those of Examples I-1, I-2, I-3, I-4, and I-5, respectively, except that powder particles of talk were not used. Consequently, in each of these Comparative Examples, the pellets were adhered with each other just after the addition of the epoxidizing agent, so that the agitation had become difficult and the reaction had discontinued. In this case, furthermore, the contents could not be recovered from the flask.

According to the present invention I, significantly improved properties were exhibited by the addition of powder particles to the target organic polymer at the time of epoxidation. That is, it becomes possible to solve the problems of the prior art in which the blocking is occurred in resulting product, the product becomes difficult to be handled, and the workability becomes substantially worse. In addition, there is provided a specific method that utilizes the above powder particles at the time of epoxidation. Therefore, the method has the advantage of preventing the blocking between the particulate substances, using the powder particles as a particulate material for modifying other resins, or the like, substantially reducing the amount of solvent insoluble matter in the powder particles, and effecting a uniform dispersion with other resin without causing any trouble.

Next, we will describe the examples of the present invention II.

Example II-1

In a four-necked flask were placed 300 g of SBS (TR2000) used in Example I-1, 600 g of water, 1.5 g of stabilizer (Irganox 1010 (Trade name)), and 0.6 g of talc, and the contents were stirred and thoroughly mixed so as to disperse SBS. The inside of the flask was heated to 40° C., and 100 g of 30% ethyl acetate solution of peracetic acid was continuously added dropwise to the flask, the mixture being stirred for epoxidation for 5 hours at 40° C.

After completion of the reaction, solid matter was recovered from the reaction solution by filtration and was then washed with deionized water.

From the recovered solid matter, water and the remaining solvent were removed using a vented kneading extruder to obtain 302 g of epoxidized SBS.

The obtained epoxidized SBS hadagel content of 0.02% by weight and an oxirane oxygen concentration of 1.5% by weight. In addition, a gel content after the application of heat was 0.04% by weight and the surface of strands obtained by extruding pellets of the obtained epoxidized SBS was smooth ("O").

Example II-2

In a four-necked flask were placed 300 g of SBS (Tafprene 125) used in Example I-3, 600 g of water, 1.5 g of stabilizer (Irganox 1010 (Trade name)), and 0.6 g of talc, and the contents were stirred and thoroughly mixed so as to disperse SBS. The inside of the flask was heated to 40° C., and 100 g of 30% ethyl acetate solution of peracetic acid was continuously added dropwise to the flask, the mixture being stirred for epoxidation for 6 hours at 40° C. After completion of the reaction, the reaction solution was processed in the same manner as in Example II-1 to obtain 300 g of epoxidized SBS.

The obtained epoxidized SBS had a gel content of 0.02% by weight and an oxirane oxygen concentration of 1.5% by weight. In addition, a gel content after the application of heat was 0.04% by weight and the surface of strands obtained by extruding pellets of the obtained epoxidized SBS was smooth ("O").

Example II-3

In a four-necked flask were placed 300 g of SBS (Tafprene 125) used in Example I-3, 600 g of water, 3.0 g of stabilizer (Irganox 1010 (Trade name)), and 0.6 g of talc, and the contents were stirred and thoroughly mixed so as to disperse SBS. The inside of the flask was heated to 40° C., and 10 g of 30% ethyl acetate solution of peracetic acid was continuously added dropwise to the flask, the mixture being stirred for epoxidation for 5 hours at 40° C. After completion of the reaction, the reaction solution was processed in the same manner as in Example II-1 to obtain 300 g of epoxidized SBS.

The obtained epoxidized SBS had a gel content of 0.02% by weight and an oxirane oxygen concentration of 1.5% by weight. In addition, a gel content after the application of heat was 0.02% by weight and the surface of strands obtained by extruding pellets of the obtained epoxidized SBS was smooth ("O").

Example II-4

In a four-necked flask were placed 300 g of SBS (TR2000) used in Example I-1, 600 g of water, 3.0 g of stabilizer (Irganox 1010 (Trade name)), and 0.6 g of talc, and the contents were stirred and thoroughly mixed so as to disperse SBS. The inside of the flask was heated to 40° C., and 100 g of 30% ethyl acetate solution of peracetic acid was continuously added dropwise to the flask, the mixture being stirred for epoxidation for 5 hours at 40° C. After completion of the reaction, the reaction solution was processed in the same manner as in Example II-1 to obtain 300 g of epoxidized SBS.

The obtained epoxidized SBS had a gel content of 0.02% by weight and an oxirane oxygen concentration of 1.5% by weight. In addition, a gel content after the application of heat was 0.02% by weight and the surface of strands obtained by extruding pellets of the obtained epoxidized SBS was smooth ("O").

Example II-5

In a four-necked flask were placed 300 g of SBS (Tufprene125) 600 g of water, and 0.9 g of stabilizer (Irganox 1010 (Trade name)) and the contents were stirred and thoroughly mixed so as to disperse SBS. The inside of the flask was heated to 40° C., and 25 g of 30% ethyl acetate solution of peracetic acid was continuously added dropwise, the mixture being stirred for epoxidation for 6 hours at 40° C. After completion of the reaction, the reaction solution was processed in the same manner as in Example II-1 to obtain 301 g of epoxidized SBS. The obtained epoxidized SBS had a gel content of 0.01% by weight and an oxirane oxygen concentration of 0.35% by weight. In addition, a gel content after the application of heat was 0.01% by weight and the surface of strands obtained by extruding pellets of the obtained epoxidized SBS was smooth (1101).

Comparative Example II-1

In this example, 300 g of epoxidized SBS was obtained by the same reaction and recovery steps as those of Example II-1, except that no heat stabilizer was used. The obtained epoxidized SBS had a gel content of 0.10% by weight and an oxirane oxygen concentration of 1.5% by weight. In addition, a gel content after the application of heat was 1.0% by weight and the surface of strands obtained by extruding pellets of the obtained epoxidized SBS was grainlike (X)

Comparative Example II-2

In this example, 300 g of epoxidized SBS was obtained by the same reaction and recovery steps as those of Example II-2, except that no heat stabilizer was used. The obtained epoxidized SBS had a gel content of 0.12% by weight and an oxirane oxygen concentration of 1.5% by weight. In addition, a gel content after the application of heat was 0.35% by weight and the surface of strands obtained by extruding pellets of the obtained epoxidized SBS was grainlike (X).

According to the present invention II, therefore, there is provided a method for cost-effectively producing an epoxidized polymer having a lower amount of gel generated by the application of heat and an excellent heat stability, where the pellet raw material can be epoxidized directly, the stabilizer can be included in it while there is no need to mix the stabilizer or the like in it by means of kneading, in addition to the decrease in the energy cost for the dissolution in the solvent and recovery of the product from the solvent, and so on, compared with the conventional method where the raw material is served as an organic solution to be epoxidized.

Accordingly, the epoxidized diene polymers obtained according to the present inventions I and II can be used to form various molded products, such as sheets, films, injection molded products having various shapes, and blow-molded products, in addition to be used as: modifying agents for various kinds of thermoplastic resins and rubbers; adhesive compounds; raw materials for adhesives; asphalt modifiers; and as raw materials for household electronic appliances, automobile parts, industrial parts, household articles, and toys, and so on.

What is claimed is:

1. A process for producing an epoxidized diene polymer, comprising:

dispersing or suspending a diene polymer (C) in a medium (A) in the presence of powder particles (B) insoluble in the medium (A), wherein the diene polymer has a ball-reduced particle size in the range of 0.05 to 20 mm; and epoxidizing a double bond of the diene polymer (C) by an epoxidizing agent in the presence of an optionally added phenol-based stabilizer and/or an optionally added phosphorus-based stabilizer.

2. A process for producing an epoxidized diene polymer, comprising:

dispersing or suspending a diene polymer (C) in an aqueous medium in the presence of a phenol-based stabilizer and/or an phosphorus-based stabilizer, wherein the diene polymer has a ball-reduced particle size in the range of 0.05 to 20 mm; and epoxidizing the diene polymer (C) by an epoxidizing agent in the presence of powder particles (B) insoluble in a medium that is optionally added.

3. A process for producing an epoxidized diene polymer according to claim 1, wherein the medium (A) is an inert medium which does not dissolve the diene polymer.

4. A process for producing an epoxidized diene polymer as claimed in claim 3, wherein the medium (A) is water.

5. A process for producing an epoxidized diene polymer as claimed in claim 1, wherein the powder particles (B) are inorganic particles and/or organic-inorganic complex particles.

6. A process for producing an epoxidized diene polymer as claimed in claim 5, wherein the inorganic particles are talc and/or silica.

7. A process for producing an epoxidized diene polymer as claimed in claim 1, wherein the total usage amount of the phenol-based stabilizer and/or phosphorus-based stabilizer is 0.05–5 parts by weight with respect to 100 parts by weight of the diene polymer.

8. A process for producing an epoxidized diene polymer as claimed in claim 1, wherein the diene polymer (C) is at least one selected from the group consisting of:

butadiene polymer, styrene/butadiene copolymer, isoprene polymer, styrene/isoprene copolymer, acrylonitrile/butadiene copolymer, and partial hydrides thereof.

9. A process for producing an epoxidized diene polymer as claimed in claim 1, wherein the epoxidizing agent is peracetic acid, or the other percarboxylic acid which can be induced using hydrogen peroxide.

10. A process for producing an epoxidized diene polymer as claimed in claim 1, wherein a solvent for accelerating an epoxidizing reaction is used at the time of the epoxidizing reaction.

11. A process for producing an epoxidized diene polymer as claimed in claim 10, wherein the solvent for accelerating the epoxidizing reaction is an organic solvent having an SP (solubility parameter) value of 10 or less.

12. A process for producing an epoxidized diene polymer as claimed in claim 11, wherein the solvent for accelerating the epoxidizing reaction is at least one selected from the group consisting of: cyclohexane, toluene, xylene, ethyl acetate; tetrahydrofuran, benzene, methyl ethyl ketone, and chloroform.

13. A process for producing an epoxidized diene polymer as claimed in claim 1, wherein the epoxidized diene polymer has an oxirane oxygen concentration of 0.3–5.0% by weight.

14. A process for producing an epoxidized diene polymer as claimed in claim 1, wherein the epoxidizing reaction of the diene polymer is performed at a temperature of 10–70° C.

15. A process for producing an epoxidized diene polymer as claimed in claim 1, comprising:

a first step in which the diene polymer (C) dispersed or suspended in medium (A) is epoxidized in the presence of an epoxidizing agent and the powder particle (B) or in the presence of an epoxidizing agent, a solvent for accelerating an epoxidizing reaction, and the powder particle (B);

a second step in which the epoxidized diene polymer is washed with water, or the epoxidized diene polymer is neutralized and washed with water; and a third step in which the solvent for accelerating the epoxidizing reaction used in the first step is removed, where the third step is an optional step to be provided as necessary.

16. A process for producing an epoxidized diene polymer as claimed in claim 15, wherein the second step further includes an operation for a solid-liquid separation to separate the epoxidized diene polymer that is to be supplied to the third step.

17. A process for producing an epoxidized diene polymer as claimed in claim 15, wherein the removal of the solvent in the third step further includes drying the epoxidized diene polymer obtained from the second step, while keeping the particle form of the epoxidized diene polymer.

18. A process for producing an epoxidized diene polymer as claimed in claim 17, wherein the removal of the solvent in the third step is performed by a kneading-type evaporator.

19. A process for producing an epoxidized diene polymer as claimed in claim 1, wherein the resulting epoxidized diene polymer has a gel content of not more than 2% by weight.

20. A process for producing an epoxidized diene polymer as claimed in claim 1, wherein the gel content of the epoxidized diene polymer after heating it in an oven for 30 minutes at a temperature of 180° C. (in air) is less than 2.5 times of the gel content of the epoxidized diene polymer before the heating.

* * * * *